June 25, 1940.  D. HEYER  2,205,977

ELECTRIC MOTOR DRIVEN POWER UNIT

Filed Oct. 24, 1934  2 Sheets-Sheet 1

INVENTOR
Don Heyer
BY John Flam
ATTORNEY

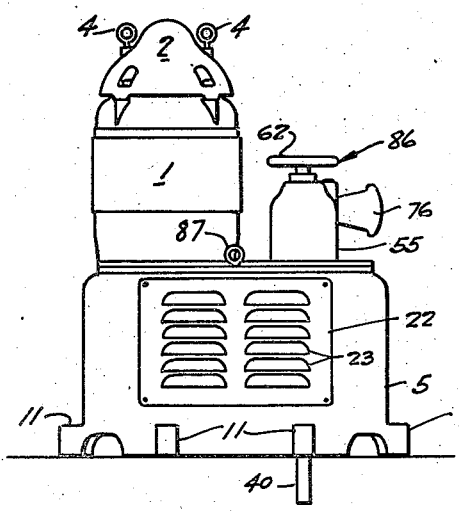
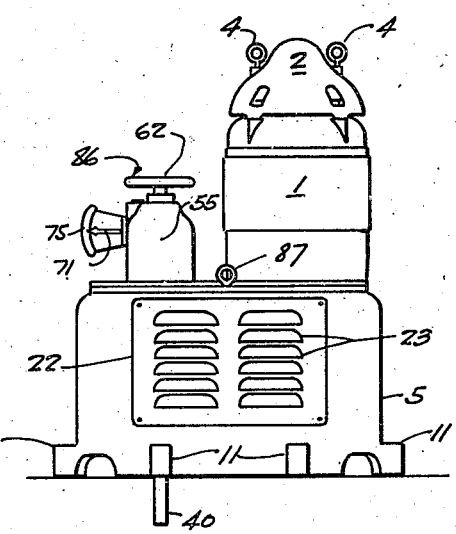
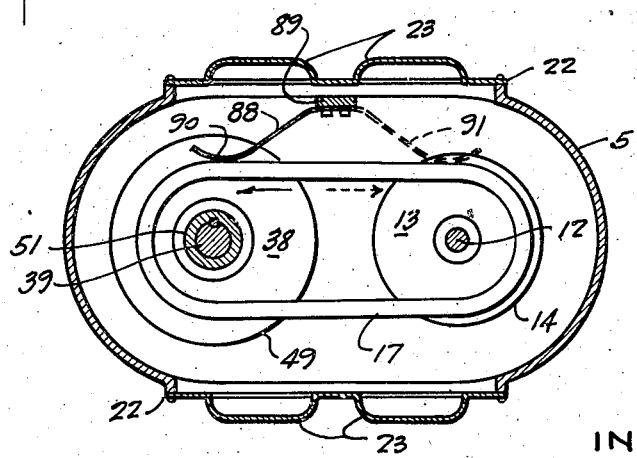
INVENTOR
Don Heyer
BY John Flam
ATTORNEY

Patented June 25, 1940

2,205,977

UNITED STATES PATENT OFFICE 2,205,977

ELECTRIC MOTOR DRIVEN POWER UNIT

Don Heyer, Los Angeles, Calif., assignor to U. S. Electrical Motors, Inc., a corporation of California Application October 24, 1934, Serial No. 749,809

12 Claims. (Cl. 74—230.17)

This invention relates to a power unit that is driven by an electric motor; and more particularly to a power unit that includes a variable ratio transmission mechanism.

Such units have been described in several earlier applications which can be identified as follows: Don Heyer, Variable speed transmission device, Serial No. 519,764, filed March 3, 1931; Don Heyer, Variable speed transmission device, Serial No. 631,533, filed September 2, 1932; Don Heyer, Variable speed power unit, Serial No. 640,707, filed November 1, 1932; Don Heyer, Variable speed drive with multiple belts, Serial No. 667,379, filed April 22, 1933; Don Heyer and Thomas G. Myers, Variable pulley structure, Serial No. 673,333, filed May 29, 1933; Don Heyer and Thomas G. Myers, Variable speed power unit, Serial No. 679,034, filed July 5, 1933; Don Heyer, Ventilated variable speed power unit, Serial No. 711,917, filed February 19, 1934; Don Heyer, Adjustable speed drive, Serial No. 732,452, filed June 25, 1934; and Don Heyer, Variable speed power unit, Serial No. 747,410, filed October 8, 1934.

This application is a continuation in part of these prior applications.

One of the common features of the power units described is the manner in which the ratio of transmission can be varied. For this purpose, a wedge shaped belt is used, engaged at opposite sides by pulley structures having opposed inclined faces. At least one of the pulley structures has an adjustable effective diameter. This pulley structure has a pair of sections forming the opposed inclined faces, axially adjustable relative to each other. When the sections are brought closer together, the belt rides radially outwardly, and the effective diameter of the pulley is increased. Conversely, when the sections are separated, the belt is permitted to enter between the faces and to approach the axis, and the effective diameter is reduced.

It is one of the objects of this invention to provide a compact, efficient unit of this character, in which the axes of the driving and driven pulley structures are vertical, so as to drive a vertical load driving shaft.

It is another object of this invention to facilitate the installation and repair of such vertical units.

It is still another object of this invention to provide a vertical power unit of this character which includes a casing or housing that encloses the pulley structures, and that supports on its exterior, the driving motor being supported on top of the casing, and the arrangement being such that the relative positions of motor driven pulley and the other pulley can be interchanged easily.

It is still another object of this invention to ensure against the accumulation of static electricity on the belt, irrespective of the position of the belt as it varies with variation in the speed ratio.

It is another object of this invention to ensure against deleterious effects of static electricity on relatively slidable parts of the adjustable mechanism; and particularly by ensuring that any accumulated static electricity will be conducted to a grounded part of the system.

This invention possesses many other advantages, and has other objects which may be made more easily apparent from a consideration of one embodiment of the invention. For this purpose there is shown a form in the drawings accompanying and forming part of the present specification. This form shall now be described in detail, illustrating the general principles of the invention; but it is to be understood that this detailed description is not to be taken in a limiting sense, since the scope of the invention is best defined by the appended claims.

Referring to the drawings:

Figs. 2 and 2A are elevations of the embodiment of the invention shown in Fig. 1, showing the manner in which the position of the electric motor with its driving pulley, can be interchanged with the position of the driven pulley with the ratio varying mechanism; and Fig. 3 is a diagrammatic sectional view taken along the plane 3—3 of Fig. 1.

Figure 1:
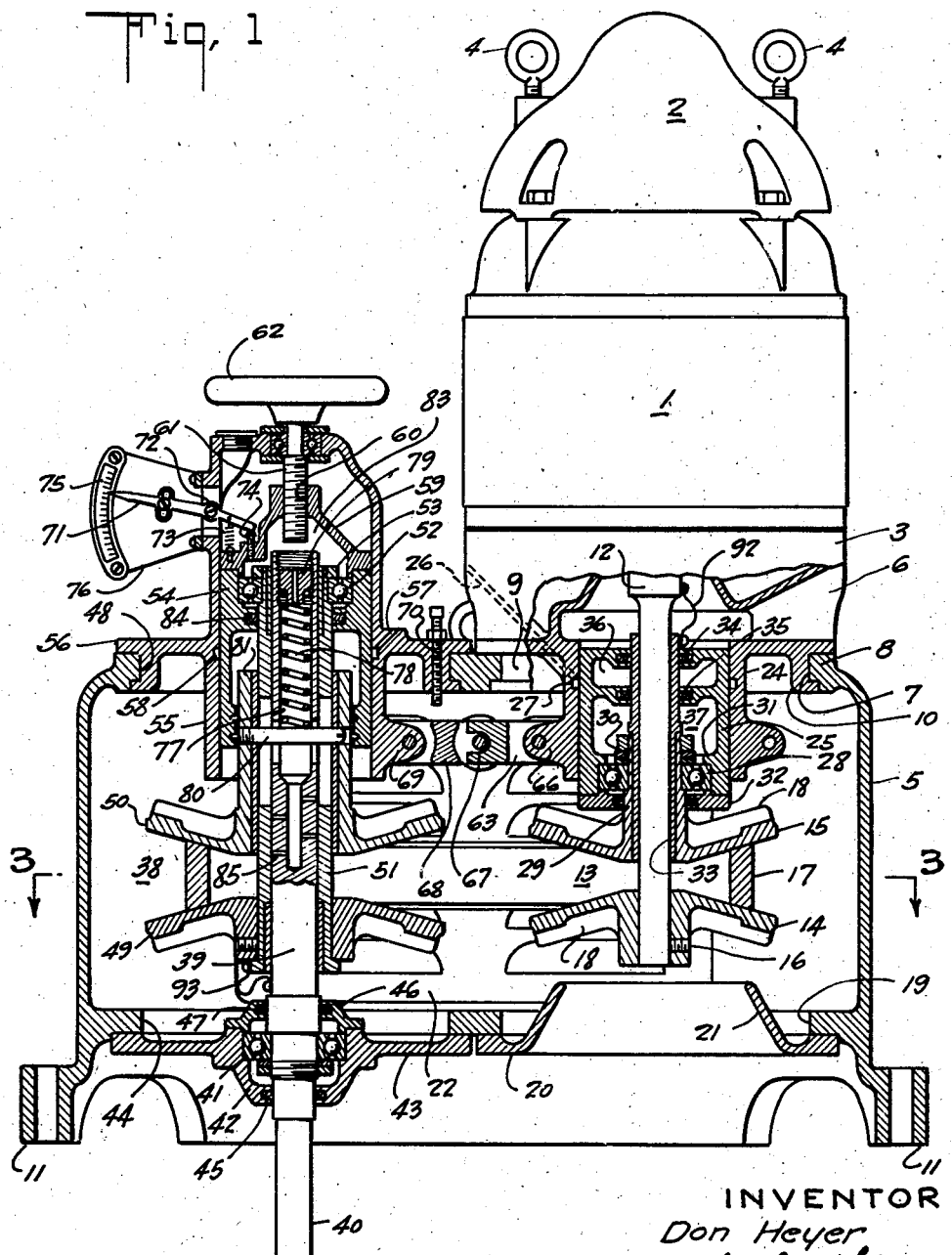
Figure 1 is a view, mainly in vertical section, of an embodiment of the invention.

The electric motor 1 is shown in this instance as of the vertical type. It can be provided with a drip-proof top 2 and an end frame 3. The top 2 can be provided with appropriate eyebolts 4 for facilitating removal and replacement of the motor on top of a casing 5 on which it is supported.

The frame 3 is shown as provided with a transverse air passageway 6 for permitting egress or ingress of ventilating air in or out of the motor casing.

In order to support the motor 1 on casing 5, this casing is provided with a flanged aperture 7. The flange 8 of this aperture, can be interrupted, and can be accommodated in a groove 9 located in a flange 10, forming an integral part of the bottom frame 3. The flange 10 can be correspondingly interrupted so that the interrupted portions of flange 8 can be passed between the interrupted portions of flange 10, and then by a relative angular motion the two members 3 and 5 can be joined together, as shown in Fig. 1.

The casing 5 is provided with appropriate feet 11 for supporting it on a horizontal surface. The motor shaft 12 extends into the casing and serves to drive directly, a pulley structure 13. This pulley structure is shown in this instance as having a variable effective diameter. For this purpose the pulley structure includes pulley sections 14 and 15 having opposed inclined faces. One of the sections can be fixed to the shaft 12 as by the aid of a set screw 16. The other pulley section such as 15 is arranged to be adjusted in an axial direction toward or from the pulley section 14. The sections 14 and 15 are in driving engagement with the sides of a V-shaped belt 17; and as explained hereinbefore, the relative positions of sections 14 and 15 determine the effective diameter of the pulley structure 13.

Preferably each of the pulley sections 14 and 15 is provided with a series of fan blades such as 18 to provide an air circulation into and out of the casing 5. In order to provide ingress and egress of air with respect to the casing 5, the bottom of the casing can be provided with an aperture 19, over which is fastened a cover member 20. This cover member is provided with an upwardly converging deflector wall 21 forming a passageway for ventilating air. Similarly on each side of the casing 5, there is provided a cover plate 22 (Figs. 2 and 2A), having a series of downwardly directed louvres 23.

The manner in which the pulley section 15 can be adjusted will now be described. The frame 3 is provided with a downwardly extending cylindrical guide member 24. In this guide member is supported a sliding cylindrical structure 25. The sliding surfaces may be lubricated as by the aid of a passageway 26, leading to an internal groove 27 inside of the cylindrical guide member 24.

The slide member 25 is arranged to impart an axial force upon pulley section 15, while permitting rotation of pulley section 15 within the slide 25.

This is accomplished by the aid of the thrust ball bearing structure 28. The inner race of this structure is rigidly mounted on the hub 29 of section 15, as by being urged against a shoulder by the clamping device 30. The outer race of ball bearing structure 28 is confined against a shoulder 31 inside of the member 25, and is held in place by cover member 32. This cover member 32 also serves as a lubricant retaining means.

The hub 29 of section 15 can be lined with a sleeve 33 for providing sliding surfaces of suitable character between the pulley section 15 and the motor shaft 12. The pulley section 15 can be appropriately splined to the shaft 12.

Lubricant retaining washers such as 34 and 35 can be provided adjacent the upper end of the member 25, defining the lubricant chambers 36 and 37 surrounding the hub 29.

The belt 17 is in driving relation to a driven pulley structure 38. This pulley structure is arranged to drive the load driving shaft 39, which has a vertical axis. This load driving shaft 39 is provided with a downwardly extending portion 40 projecting below the casing 5.

At the bottom of the casing, appropriate means can be provided for rotatably supporting the shaft 40. For example a thrust ball bearing structure 41 can have its inner race supported against a shoulder on shaft 40. Its outer race can be held inside of a cap structure 42. This cap structure 42 has a circular flange 43 fastened over an aperture 44 similar to aperture 19. The cap structure 42 can be made lubricant tight as by the aid of the lubricant retaining washer 45. It can be provided with a cover 46, located in the inside of the casing. This cover 46 can also have a lubricant retaining washer 47. The cover serves to hold the outer race of the ball bearing structure 41 firmly in place.

The arrangement is such that the bearing structure, including parts 42 and 43, can be interchanged with the cover 20, whereby it is possible to interchange to relative positions of shafts 12 and 39 with their associated mechanisms. Thus pulley structure 13 can be made small enough in diameter so that when the frame 3 of motor 1 is freed from flange 8, and belt 17 taken off of pulley structure 13, the entire motor structure with the pulley structure 13 can be withdrawn through aperture 7, by lifting upwardly on eye-bolts 4.

A similar flanged aperture 48 is provided at the top of the casing 5, for supporting the shaft 39 with its associated pulley structure and control structure. This pulley structure and the associated structure can be removed through the aperture 48 after the belt 17 is disengaged, and after cap 46 is loosened from member 42. The removal of the belt 17 and loosening of cap 46 can be accomplished after cover member 20 is removed as by reaching into the casing through aperture 19.

The pulley structure 38 is so arranged that one section 49 is axially adjustable with respect to the opposite action 50. For this purpose the pulley section 49 is mounted on a long sleeve 51. The upper end of this long sleeve 51 is rotatably supported by a ball bearing structure 52. The inner race of this ball bearing structure is held against a shoulder on sleeve 51 as by the aid of the clamp nut 53. The outer race is supported against a shoulder on a sliding member 54. This sliding member 54 is guided for movement in a cylindrical guide 55, shown as integral with a flange 56. This flange 56 is provided with an interrupted portion similar to the corresponding flange of the frame member 3, for engagement with the flanged aperture 48.

Lubrication for the sliding surfaces between members 54 and 55 can be provided, as through a passageway 57 and an annular groove 58 located inside of the guide 55.

Attached to the top of the sliding member 54 is a cap structure 59 having a threaded aperture 60. The aperture 60 is adapted to be engaged by a threaded stud 61, operated as by a handwheel 62. This handwheel is shown as appropriately supported for rotation in the end wall of the cylinder guide member 55.

It is apparent that by turning the hand-wheel 62, the axial position of section 49 can be adjusted. This axial motion is caused to provide a corresponding axial motion of pulley section 31 for pulley structure 13. For this purpose an interlocking mechanism can be provided between the guide members 54 and 25. Thus the guide member 25 can be engaged by a shift fork 63, having pins engaging through slots in the cylindrical guide 24 and engaging the guide 25. In this way angular rotation of the guide 25 is prevented. The fork 63 can be pivoted on an ear 66 formed integrally with the cylindrical guide 24.

A slot and pin connection 67 is provided between the free end of the fork 63 and a similar fork 68 acting on slide 54. This form 68 can be similarly pivoted on an ear 69 formed integral with the cylindrical guide 55.

If desired, a stationary abutment such as an adjustable screw 70 can be provided in the flange 56 for limiting the extent of the adjustment, and this screw 70 is adapted to engage the fork 68 in one of its extreme positions.

Indication of the speed ratio can be secured as by the aid of a pointer and scale device. For example, a pointer 71 can be pivoted on a pivot pin 72 and can be urged as by a tension spring 73 against an adjustable abutment 74. This abutment 74 can be joined to the cap 59. The pointer moves over a scale 75 supported on a stationary bracket 76. This bracket 76 is supported in turn on one wall of the cylindrical guide member 55.

The pulley section 49 is appropriately splined to shaft 39 in order to be in driving engagement therewith. Pulley section 50, instead of being rigidly connected to the shaft 39, is urged under spring tension toward pulley section 49 to impart initial pressure against belt 17 and also to take up for belt wear. For this purpose the shaft 39 has an upper hollow portion 77, in which is located a compression spring 78. The upper end of the compression spring abuts against a shoulder of a headless screw 79, engaging the threads in the upper end of hollow portion 77. In this way the compression force of spring 78 can be adjusted. The lower end of compression spring 78 abuts against a transverse pin 80, which passes through appropriate slots in the shaft 39 as well as in the sleeve 51, and is fastened to the hub 81 of the pulley section 50. The pin 80 therefore serves as a spline connection between the pulley section 50 and the shaft 39. The slots 82 in hub 51 are long enough to take care of the relative axial adjustments.

Furthermore, a lubricant chamber 83 is formed in the upper end of the slide 54, as by the aid of the lubricant retaining washer 84 acting against the hub 51. Lubricant can obviously pass from this chamber through the hollow portion 77, and radially outward through a series of small apertures 85. This lubricates the sliding surfaces between sleeve 51 and shaft 39.

It is apparent that since the external diameter pulley structure 38 is smaller than the aperture 48, the variable pulley structure and its associated parts can be removed by an upward pull from casing 5, and can be interchanged in position with the motor 1 and its associated parts. This interchange in position is indicated by the aid of Figures 2 and 2A. The mechanism 86 as well as the load driving shaft 40 is shown to the left of motor structure 1 in Fig. 2; but this position can be interchanged as shown in Fig. 2A.

In order to facilitate transportation of casing 5 and the parts supported thereon, several eyebolts, such as 87 (Figs. 2 and 2A) can be provided on top of the casing 5.

There may be some accumulation of static electricity on the moving parts of the apparatus. For this purpose a rake mechanism can be provided contacting at all times with the belt 17. This is shown most clearly in Fig. 3. Here the rake mechanism is shown as a leaf spring structure 88 on one side wall 89 of the casing 5. The free end of the leaf spring structure 88 is arranged to contact with the belt 17 to ground the static electricity to the frame. As the belt 17 moves toward or from the axis of shaft 40 in the process of speed ratio adjustment, the contacting portion 90 of the leaf spring 88 stays in contact for all of these positions.

In case the direction of rotation of the shafts 12 and 40 be reversed, the leaf spring structure 88 can also be reversed as indicated by the dotted line position 91.

In order further to ensure against any harmful electrical action between sliding surfaces, there is shown a pigtail connection 92 between sleeve 33 of pulley section 15 and shaft 12. A similar pigtail connection 93 can be provided between sleeve 51 and shaft 40. These pigtails do not interfere with the axial adjustments and ensure good electrical connection from the adjustable pulley structures to the respective shafts, thereby eliminating any possibility of an electrical potential difference between the sliding mechanisms and the shafts.

I claim:

1. In a variable ratio power transmission unit, a vertical electric motor having a shaft, a casing having an aperture by the aid of which said motor is mounted on said casing, the motor shaft extending downwardly into the casing, a pulley structure inside said casing and directly connected to said shaft, a driven pulley structure having a vertical axis also located in said casing, a belt for transmitting power between said pulley structures, and means for varying the effective diameter of said driven pulley structure, said casing having another aperture by the aid of which said means can be mounted on the casing, and said means being connected to the driven pulley structure, said apertures associated with said driving and driven pulley structures providing means whereby said driving and driven pulley structures may be removed from said casing by passing said pulley structures through the respective apertures associated therewith.

2. In a variable ratio power transmission unit, a vertical electric motor having a shaft, a casing having an aperture by the aid of which said motor is mounted on said casing, the motor shaft extending downwardly into the casing, a pulley structure inside said casing and directly connected to said shaft, a driven pulley structure having a vertical axis also located in said casing, a belt for transmitting power between said pulley structures, and means for varying the effective diameter of said driven pulley structure, said casing having another aperture by the aid of which said means can be mounted on the casing, and said means being connected to the driven pulley structure, said apertures providing means whereby said pulley structures may be removed from the casing and passed through the respective apertures, and said apertures being of the same form so that the relative positions of the motor driven pulley structure and of the other pulley structure can be interchanged.

3. In a variable ratio power transmission unit, a vertical electric motor having a shaft, a casing having an aperture by the aid of which said motor is mounted on said casing, the motor shaft extending downwardly into the casing, a pulley structure inside said casing and directly connected to said shaft, a driven pulley structure having a vertical axis also located in said casing, a belt for transmitting power between said pulley structures, means for varying the effective diameter of said driven pulley structure, said casing having another aperture by the aid of which said means can be mounted on the casing, and said means being connected to the driven pulley structure, said apertures providing means whereby said pulley structures may be removed from the casing and passed through the respective apertures, and said apertures being of the same form so that the relative positions of the motor pulley structure and of the driven pulley structure can be interchanged, a load driving shaft upon which the driven pulley structure is mounted and projecting downwardly outside of the casing, said casing having a pair of similar apertures at the bottom, a bearing structure for the load driving shaft supported in one aperture, and a cover plate supported underneath the motor pulley in the other aperture, said bearing structure and cover plate being interchangeable in said apertures.

4. In a variable ratio power transmission unit, a driving pulley structure, a driven pulley structure, a belt for transmitting power between said pulley structures, means for varying the effective diameter of at least one of said structures, both of said structures having vertical axes, a casing for said structures, said diameter varying means being supported on the casing, a vertical electric motor also supported on the casing and directly connected to said driving pulley structure, said casing having downwardly directed opening on the side thereof for the passage of ventilating air, fan means within said casing for producing a circulation of cooling air through said casing, and the frame of the motor having an opening for ventilating air.

5. In a variable ratio power transmission unit, a vertical electric motor having a shaft, a casing having an aperture by the aid of which said motor is mounted on said casing, the motor shaft extending downwardly into the casing, a pulley structure inside said casing and directly connected to said shaft, a driven pulley structure having a vertical axis also located in said casing, a belt for transmitting power between said pulley structures, means for varying the effective diameter of said driven pulley structure, said casing having another aperture by the aid of which said means can be mounted on the casing, and said means being connected to the driven pulley structure, said pulley structures being such that they may be removed from the casing and passed through the respective apertures, and said apertures being of the same form so that the relative positions of the motor pulley structure and of the driven pulley structure can be interchanged, a load driving shaft upon which the driven pulley structure is mounted and projecting downwardly outside of the casing, said casing having a pair of similar apertures at the bottom, a bearing structure for the load driving shaft supported on a cover plate underneath the driven pulley in one of the lower apertures, said bearing structure and cover plate being interchangeable in said apertures, said casing having downwardly directed openings on the side thereof for ventilating air, and the cover having an aperture for ventilating air, and fan means rotated with one of said pulley structures for circulating air through the casing.

6. In a variable ratio transmission device including a casing, a pair of pulley structures as well as a belt in driving relation to the structures in the casing, one of said structures having a pair of relatively axially adjustable sections forming by axial adjustment, variable effective diameters, means for passing static electricity from the belt to ground, comprising a grounded collector supported in the casing and in continuous sliding contact with the belt, and means for yieldingly urging said collector in contact with the belt, said means being adapted to maintain the collector in contact with the belt as the position of the belt changes in response to adjustment of the adjustable pulley structure.

7. In a variable ratio transmission device including a casing, a pair of pulley structures as well as a belt in driving relation to the structures in the casing, one of said structures having a pair of relatively axially adjustable sections forming by axial adjustment, variable effective diameters, and means for passing static electricity from the belt to the ground, comprising a leaf spring structure supported on the casing and in continuous sliding contact with the belt, said structure being adapted to remain in contact with the belt as the position of the belt changes in response to adjustment of the adjustable pulley structure.

8. In combination, a casing having vertical walls and a horizontal wall at the top thereof joining said vertical walls, as well as means formed thereon adjacent to the lower edge of said vertical walls for supporting said casing, an adjustable ratio power transmission mechanism in said casing and supported thereon, said mechanism including a vertical driving shaft, a vertical driven shaft, a driving pulley structure mounted on said driving shaft, a driven pulley structure mounted on said driven shaft, each of said pulley structures having an adjustable effective diameter, and a belt for transmitting power between said pulley structures, said horizontal wall at the top of said casing having a pair of apertures formed therein respectively adjacent to the axes of said driving and driven shafts, and means forming a pair of removable covers respectively for each of said apertures, said apertures and said removable covers provided therefor providing means whereby said driving and driven pulley structures may be vertically removed from the said casing through the respective apertures associated therewith.

9. In a variable ratio power transmission unit, a casing having vertical walls and a horizontal wall at the top thereof joining said vertical walls, as well as means formed thereon adjacent to the lower edge of said vertical walls for supporting said casing, a vertical electric motor supported on said horizontal wall and having its shaft extending downwardly into said casing, a driving pulley structure inside said casing and mounted on said motor shaft, a vertical load driving shaft projecting downwardly outside of said casing, a driven pulley structure within said casing and mounted on said load driving shaft, a belt for transmitting power between said pulley structures, said driven pulley structure having an adjustable effective diameter and including a pair of pulley sections with opposed inclined faces, forming by relative axial adjustment variable effective pulley diameters, said horizontal wall having an aperture formed therein adjacent to the axis of said load driving shaft, means forming a removable cover for said aperture, and one of said vertical walls having an aperture formed therein for providing access to said belt and said pulley structures, said apertures formed in said vertical and horizontal walls providing means whereby said driving belt may be removed from said driven pulley structure.

10. In a variable ratio power transmission unit, a casing having vertical walls and a horizontal wall at the top thereof joining said vertical walls, as well as means formed thereon adjacent to the lower edge of said vertical walls for supporting said casing, a vertical electric motor supported on said horizontal wall and having its shaft extending downwardly into said casing, said motor shaft being substantially entirely supported on said horizontal wall, a driving pulley structure in said casing and mounted on said motor shaft, a vertical driven shaft, a driven pulley structure within said casing and mounted on said driven shaft, a belt for transmitting power between said pulley structures, each of said pulley structures having an adjustable effective diameter and including a pair of pulley sections with opposed inclined faces forming by relative axial adjustment variable effective pulley diameters, means for interlocking the adjustment of the effective diameters of said pulley structures, said horizontal wall having an aperture formed therein adjacent to the axis of said driven shaft, a removable cover for said aperture, and one of said vertical walls having an aperture formed therein, providing access to said interlocking means for disengaging said interlocking means to release the belt tension, whereby said belt may be passed over the end of said motor shaft and out of said casing upon the removal of said removable cover.

11. In a variable ratio power transmission unit, a casing having a pair of spaced oppositely facing horizontal walls, each of said walls having a pair of supporting surfaces formed thereon, the supporting surfaces formed on each wall being substantially equivalent and horizontally displaced from each other, the pair of surfaces on one wall being substantially opposite to the pair of surfaces formed on the other wall, a driving pulley structure, a driven pulley structure, both of said structures having vertical axes, means for varying the effective diameter of at least one of said structures, a supporting flange associated with the driving pulley structure, a supporting flange associated with the driven pulley structure, said flanges being supported by the aid of the supporting surfaces on the horizontal walls, said flanges and said supporting surfaces providing means whereby the positions of the driving and driven pulleys may be interchanged within the casing.

12. In a variable ratio power transmission unit, a casing having a pair of spaced oppositely facing horizontal walls, each of said walls having a pair of supporting surfaces formed thereon, the supporting surfaces formed on each wall being substantially equivalent and horizontally displaced from each other, the pair of surfaces on one wall being substantially opposite to the pair of surfaces formed on the other wall, a driving pulley structure, a driven pulley structure, both of said structures having vertical axes, a supporting flange associated with each of said pulley structures, said flanges being supported by the aid of the supporting surfaces on the horizontal walls, and speed adjusting mechanism associated with one of said pulley structures and supported by one of said surfaces, said flanges and said supporting surfaces providing means whereby the portions of the driving and driven pulleys may be interchanged within the casing.

DON HEYER.